US010317562B2

(12) United States Patent
San Martin et al.

(10) Patent No.: US 10,317,562 B2
(45) Date of Patent: Jun. 11, 2019

(54) CROSS-COUPLING COMPENSATION VIA COMPLEX-PLANE BASED EXTRAPOLATION OF FREQUENCY DEPENDENT MEASUREMENTS

(71) Applicant: HALLIBURTON ENERGY SERVICES, INC., Houston, TX (US)

(72) Inventors: Luis E. San Martin, Houston, TX (US); Bill Schaecher, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 313 days.

(21) Appl. No.: 15/109,386

(22) PCT Filed: Jan. 22, 2014

(86) PCT No.: PCT/US2014/012541
§ 371 (c)(1),
(2) Date: Jun. 30, 2016

(87) PCT Pub. No.: WO2015/112136
PCT Pub. Date: Jul. 30, 2015

(65) Prior Publication Data
US 2016/0327676 A1 Nov. 10, 2016

(51) Int. Cl.
*G01V 3/18* (2006.01)
*G01V 3/28* (2006.01)
(52) U.S. Cl.
CPC . *G01V 3/28* (2013.01); *G01V 3/18* (2013.01)
(58) Field of Classification Search
None
See application file for complete search history.

(56) References Cited

U.S. PATENT DOCUMENTS 4,415,895 A 11/1983 Flagg
6,777,940 B2 8/2004 Macune
(Continued)

FOREIGN PATENT DOCUMENTS

WO 2012/067599 5/2012
WO 2012/067817 5/2012
(Continued)

OTHER PUBLICATIONS

PCT International Search Report and Written Opinion, dated Oct. 22, 2014, Appl No. PCT/US2014/012541, "Cross-Coupling Compensation via Complex-Plane Based Extrapolation of Frequency-Dependent Measurements," Filed Jan. 22, 2014, 15 pgs.
(Continued)

*Primary Examiner* — Melissa J Koval
*Assistant Examiner* — Nasima Monsur
(74) *Attorney, Agent, or Firm* — Benjamin Fite; C. Tumey Law Group PLLC

(57) ABSTRACT

Illustrative logging methods, systems, and software, provide for correction of cross-coupling error via a complex-plane extrapolation technique. Frequency-dependent measurements at each given borehole position will trace out a dependence of a quadrature signal component on the in-phase component. With linear or curve-fit extrapolation to the real axis, the cross-coupling error is readily compensated, enabling more accurate formation property logs to be derived over greater range of operating environments. The technique is particularly suitable for use with laterolog resistivity tools, where cross-coupling between current and voltage conductors might otherwise be problematic.

20 Claims, 5 Drawing Sheets

(56) References Cited

U.S. PATENT DOCUMENTS

| | | | |
|---|---|---|---|
| 7,176,938 B2 | 2/2007 | Feng | |
| 7,379,818 B2* | 5/2008 | Rabinovich | G01V 3/28 324/339 |
| 7,726,193 B2 | 6/2010 | Reiderman et al. | |
| 2002/0040274 A1* | 4/2002 | Yin | G01V 3/38 702/7 |
| 2005/0030059 A1* | 2/2005 | Tabarovsky | G01V 3/28 324/323 |
| 2007/0216417 A1 | 9/2007 | Ritter et al. | |
| 2008/0252296 A1 | 10/2008 | Hu et al. | |
| 2008/0272789 A1* | 11/2008 | San Martin | G01V 3/24 324/355 |
| 2011/0161009 A1* | 6/2011 | Wang | G01V 5/04 702/9 |
| 2011/0248716 A1 | 10/2011 | Folberth | |
| 2012/0074946 A1 | 3/2012 | Forgang et al. | |
| 2013/0234718 A1 | 9/2013 | Li et al. | |

FOREIGN PATENT DOCUMENTS

| | | |
|---|---|---|
| WO | 2013/066436 | 5/2013 |
| WO | 2015/112136 | 7/2015 |

OTHER PUBLICATIONS

PCT International Preliminary Report on Patentability, dated Jan. 8, 2016, Appl No. PCT/US2014/012541, "Cross-Coupling Compensation via Complex-Plane Based Extrapolation of Frequency-Dependent Measurements," filed Jan. 22, 2014, 10 pgs.

* cited by examiner

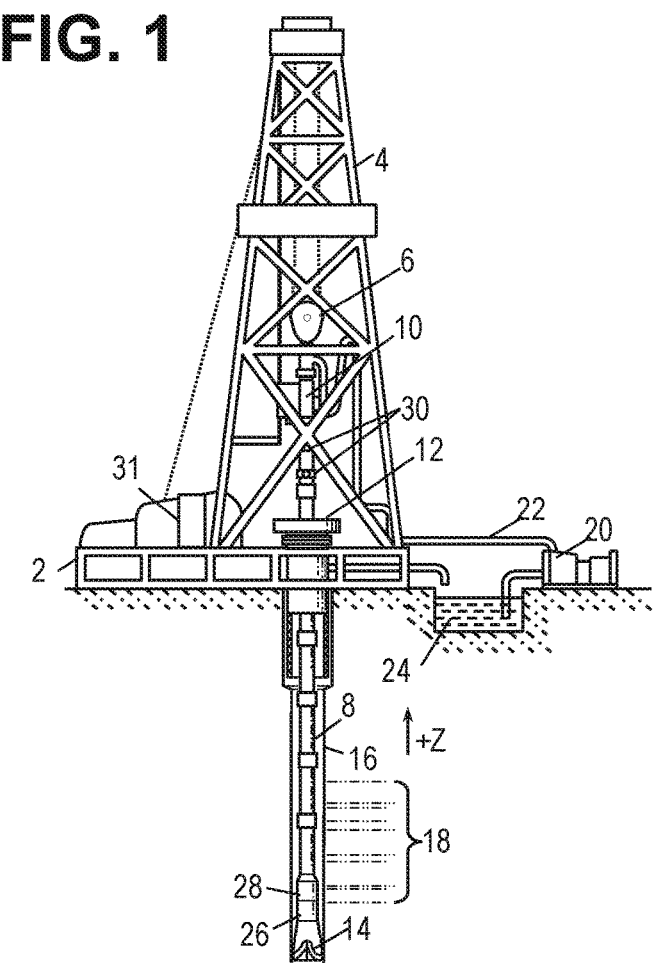
FIG. 1
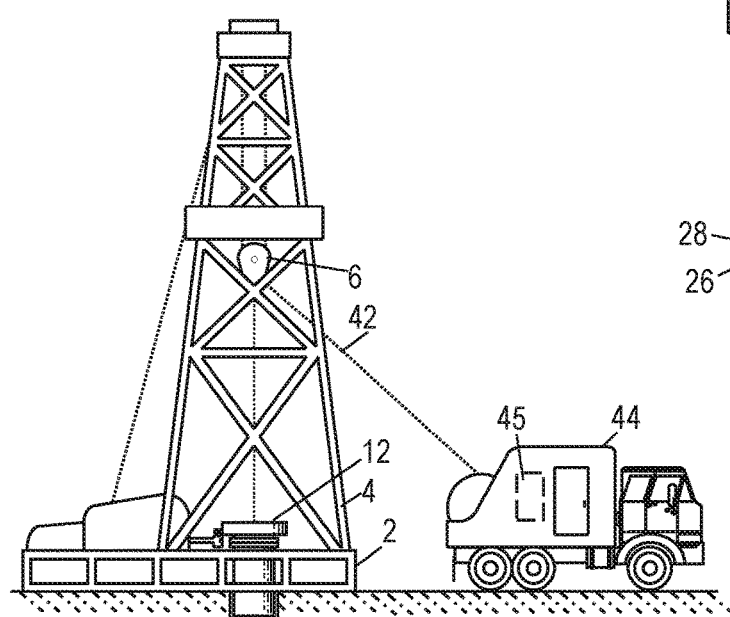
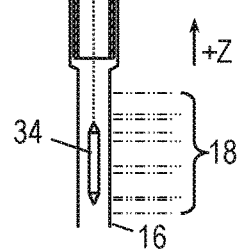
FIG. 2

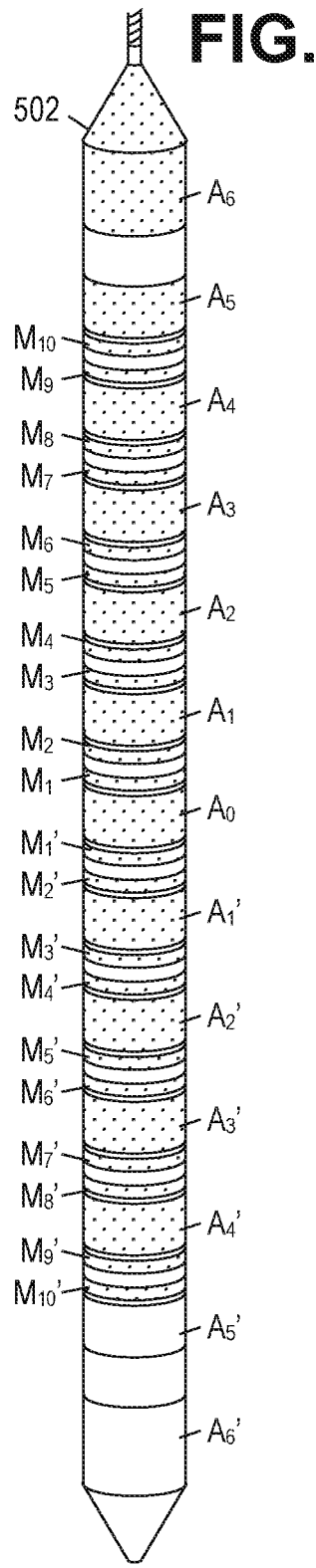
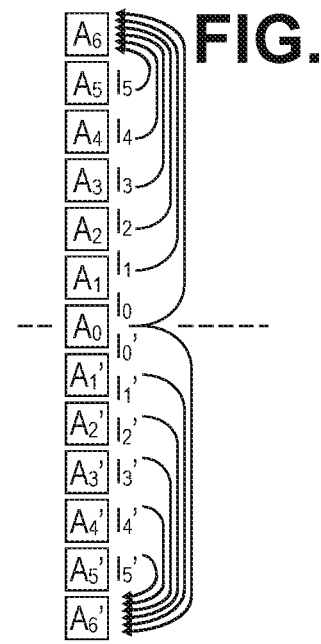

CROSS-COUPLING COMPENSATION VIA COMPLEX-PLANE BASED EXTRAPOLATION OF FREQUENCY DEPENDENT MEASUREMENTS

BACKGROUND

Modern oil field operators demand access to a great quantity of information regarding the parameters and conditions encountered downhole. Such information typically includes characteristics of the earth formations traversed by the borehole and data relating to the size and configuration of the borehole itself. The collection of information relating to conditions downhole, which commonly is referred to as "logging," can be performed by several methods including wireline logging and "logging while drilling" (LWD).

Among the available wireline logging and LWD tools are a variety of resistivity logging tools including, in particular, laterolog tools. Such tools typically include a central electrode around a tool body, with guard electrodes symmetrically spaced above and below the central electrode. The tool drives auxiliary currents between the guard electrodes and the center electrode to "focus" the current from the center electrode, i.e., to reduce dispersion of the current from the center electrode until after the current has penetrated some distance into the formation. Generally speaking, a greater depth of investigation can be achieved using more widely-spaced guard electrodes, but the vertical resolution of the measurements may suffer. Accordingly, existing tools employ multiple sets of guard electrodes at different spacings from the central electrode to enable multiple depths of investigation without unduly sacrificing vertical resolution.

A problem often experienced with many logging tools, and with laterolog tools in particular, is signal cross-coupling. When signal-carrying conductors are placed in close proximity, they tend to couple capacitively and/or inductively. Such couplings enable signal energy to leak from one conductor to another. Where conductors carrying weak signals (e.g., voltage measurements) receive energy leakage from conductors carrying strong signals (e.g., transmitter currents), this signal cross-coupling can severely impair the tool's performance. The most popular approaches to this problem generally involve heavy shielding and maximal separation of the conductors, but so far only limited successes have been achieved in this manner.

DESCRIPTION OF THE DRAWINGS

Accordingly, there are disclosed in the drawings and the following description various cross-coupling compensation methods and systems employing complex-plane based extrapolation of frequency-dependent measurements. In the drawings:

FIG. 1 shows an illustrative environment for logging while drilling ("LWD").

FIG. 2 shows an illustrative environment for wireline logging.

FIG. 5 shows an illustrative wireline laterolog tool.

FIG. 6 illustrates a current flow pattern for a laterolog tool with six sets of guard electrodes.

Figure 3:
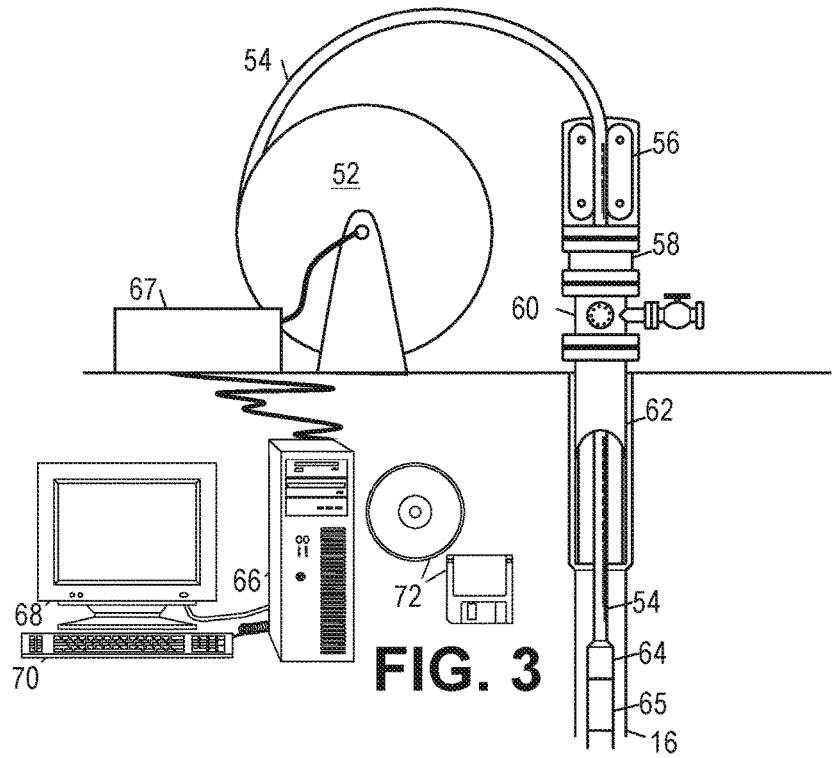
FIG. 3 shows an illustrative environment for tubing-conveyed logging.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The following description presents illustrative methods, systems, and software embodiments employing cross-coupling compensation of logging data. The disclosed embodiments are best understood in the context of the larger environments in which they operate. Three such environments are illustrated in FIGS. 1-3.

FIG. 1 shows an illustrative logging while drilling (LWD) environment. A drilling platform 2 is equipped with a derrick 4 that supports a hoist 6 for raising and lowering a drill string 8. The hoist 6 suspends a top drive 10 suitable for rotating the drill string 8 and lowering the drill string through the well head 12. Connected to the lower end of the drill string 8 is a drill bit 14. As the drill bit 14 rotates, it creates a borehole 16 that passes through various formations 18. A pump 20 circulates drilling fluid through a supply pipe 22 to top drive 10, down through the interior of drill string 8, through orifices in drill bit 14, back to the surface via an annulus around drill string 8, and into a retention pit 24. The drilling fluid transports cuttings from the borehole 16 into the retention pit 24 and aids in maintaining the integrity of the borehole 16. Various materials can be used for drilling fluid, including water-based and oil-based fluids.

An assembly of LWD tools 26 is integrated into the bottom-hole assembly near the drill bit 14. As the drill bit 14 extends the borehole 16 through the formations 18, each logging tool 26 collects measurements relating to various formation properties as well as the tool orientation and various other drilling conditions. As illustrated, the assembly of LWD tools 26 may take the form of one or more drill collars, i.e., thick-walled tubulars that provides weight and rigidity to aid the drilling process. (For the present discussion, the assembly of logging tools 26 is expected to include a resistivity tool such as an LWD laterolog tool to measure formation resistivity.) The assembly of logging tools 26 may include a telemetry sub 28 to transfer measurement data to a surface receiver 30 and to receive commands from the surface. In some embodiments, the telemetry sub 28 does not communicate with the surface, but rather stores logging data for later retrieval at the surface when the assembly of logging tools 26 is recovered.

A computer 31 is coupled to the surface receiver 30 to receive, store, and optionally process and display the measurement data. As discussed further below, computers such as computer 31 include a processing unit coupled to a memory that stores software. The software embodies a method which is carried out by the computer when the software is executed by the processing unit. Often the software provides for a user interface that enables a user to interact with the method, e.g., by viewing and selecting configuration options, viewing results, and optionally repeating the method with different configuration parameters. In at least some embodiments, the computer 31 operates during the drilling process, enabling a user to analyze measurements in real time and, if desired, to adjust drilling parameters in a timely fashion. Some drillers may rely on logs displayed by the computer to steer the borehole 16 relative to a bed boundary.

While LWD measurements are desirable because they enable measurements to be acquired while the formations 18 are less affected by fluid invasion, the drilling operations create a high-shock, continuous vibration environment with extended exposure to downhole temperatures and pressures, yielding conditions that are generally hostile to electronic instrumentation, telemetry, and logging tool sensor operations. Consequently, many operators may prefer to conduct at least some of the logging operations with wireline logging tools.

In wireline logging, a sonde (i.e., an assembly of wireline logging tools 34) is lowered into the borehole 16, as shown in FIG. 2. The assembly of wireline logging tools 34 hangs at the end of a long wireline cable 42 that provides mechanical support to the assembly of wireline logging tools 34 and also provides an electrical connection between the assembly of wireline logging tools 34 and electrical equipment located at the surface, such as a logging facility 44. Wireline cable 42 includes conductors for transporting power to the assembly of wireline logging tools 34 and telemetry from the assembly of wireline logging tools 34 to the logging facility 44. The assembly of wireline logging tools 34 may have pads and/or centralizing springs to maintain the assembly of wireline logging tools 34 near the axis of the borehole 16 as the assembly is pulled uphole. For the present discussion, the assembly of wireline logging tools 34 is expected to include a resistivity tool such as a wireline laterolog tool for measuring formation resistivity. Logging facility 44 collects measurements from the assembly of wireline logging tools 34, and includes a computer 45 for processing and storing the measurements gathered by the wireline logging tools. As with computer 31, computer 45 includes a processing unit coupled to a memory that stores software, which may embody one or more of the methods discussed further below.

An alternative logging technique is tubing-conveyed logging, which enables "wireline-like" logging in boreholes where it is infeasible to suspend an assembly of wireline logging tools 34, e.g., highly deviated boreholes. FIG. 3 shows an illustrative coil tubing logging system in which coil tubing 54 is pulled from a spool 52 by a tubing injector 56 and injected into a well 62 through a packer 58 and a blowout preventer 60 into the borehole 16. In the borehole 16, an assembly of logging tools 65 is coupled to the coiled tubing 54 to be conveyed along the borehole 16. The assembly of logging tools 65 includes a supervisory sub 64 to coordinate operation of the various logging tools 65 and to communicate measurements from the assembly of logging tools 65 to a computer 66 on the surface via information conduits in the coiled tubing or via other telemetry channels. (For purposes of the present discussion, the assembly of logging tools 65 is expected to include a resistivity tool such as a tubing-conveyed laterolog tool for measuring formation resistivity.) An uphole interface 67 may be provided to exchange communications with the supervisory sub 64 and receive data to be conveyed to a computer 66.

Computer 66 is configured by software 72 (shown in FIG. 3 in the form of removable, non-transient information storage media) to monitor and control the supervisory sub 64 and the one or more logging tools 65 (e.g., by setting logging parameters and collecting logging tool measurements). As discussed previously, computers such as computer 66 include a memory that stores software embodying the desired methods and processes, and further include a processing unit that executes the software to carry out the desired methods and processes. System 66 includes a display device 68 and a user-input device 70 to enable a human operator to interact with the software 72 and to view the processing results, e.g., a log of formation resistivity derived from measurements obtained from the laterolog tool.

In each of the foregoing logging environments, the position of the assembly of logging tools along the borehole is tracked so as to associate the measurements collected by the logging tools with a position along the borehole 16. Such tracking may be performed with sensors on the surface that measure the deployed length of the pipe or cable that suspends the logging assembly in the borehole 16. Alternatively, or additionally, the assembly of logging tools may include a navigational sensor package with gyroscopic or inertial sensors to track the motion and position of the assembly of logging tools. For example, the assembly of LWD tools 26 may include a navigational sensor package. The assembly of wireline logging tools 34 may include a navigational sensor package. Supervisory sub 64 (in the assembly of logging tools 65) may include a navigational sensor package.

In some embodiments, the navigational sensor package also tracks the orientation of the assembly of logging tools, particularly when one or more of the logging tools obtains directional measurements. The orientation can be expressed in terms of the inclination angle and the horizontal angle of the assembly of logging tools. As is commonly defined in the art, the inclination angle is the deviation from vertically downward, the horizontal angle is the angle in a horizontal plane from true North.

Laterolog tools can be employed to perform formation resistivity measurements in each of the foregoing logging environments. A discussion of an illustrative laterolog tool construction is now presented to illustrate how signal cross-coupling can become an issue in downhole resistivity logging and how it can be addressed. A discussion of the laterolog tool electronics is in order before describing the physical construction of the tool.

Figure 4:
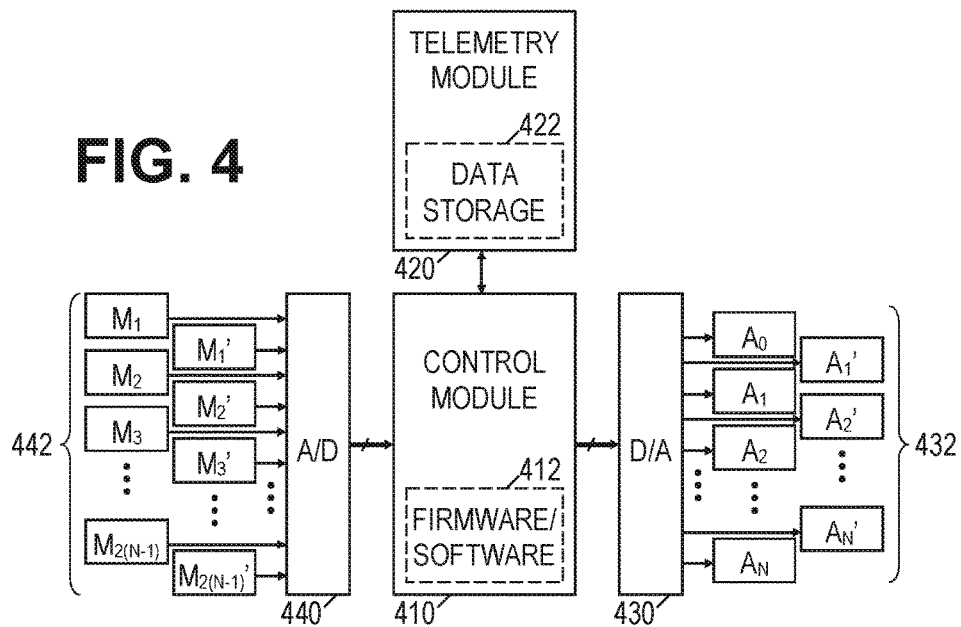
FIG. 4 is a block diagram of an illustrative laterolog tool.

FIG. 4 shows a functional block diagram of the laterolog tool electronics. The control module 410 governs the operation of the tool in accordance with software and/or firmware 412 stored in internal memory. An internal processing unit executes the software or firmware 412 to carry out a configurable formation resistivity logging operation. The control module 410 couples to telemetry module 420 to receive commands (including the desired operating parameters for the tool) and to provide measurement data. Control module 410 further connects to digital-to-analog converter 430 to drive current electrodes 432, and connects to analog-to-digital converter 440 to make voltage measurements via monitor electrodes 442. The internal processing unit of control module 410 can be, for example, a general purpose processor, a digital signal processor, a programmable gate array, or an application specific integrated circuit. Telemetry module 420 receives and stores measurement data in a nonvolatile memory 422, and further operates as a communications interface between the control module 410 and the telemetry communications mechanism.

FIG. 4 shows 2N+1 current electrodes 432 (electrodes $A_0$, $A_1, A_2, \ldots A_N, A_1', A_2', \ldots A_N'$) being independently driven via digital-to-analog converter 430, and 4(N−1) monitor electrodes 442 (electrodes $M_1$-$M_{2(N-1)}$, $M_1'$-$M_{2(N-1)}'$) being independently sensed via analog-to-digital converter 440, where N is an integer greater than 1. The center current electrode A0 is sometimes referred to as the source electrode. The outermost current electrodes $A_N$, $A_N'$, may be referred to as the return electrodes. The intermediate current electrodes $A_1$-$A_{(N-1)}$, $A_1'$-$A_{(N-1)}'$, are normally referred to as guard electrodes, and their number varies in different tool embodiments. In some tool embodiments, the guard electrodes are electrically connected in pairs, i.e., electrode $A_1$ is connected to electrode $A_1'$ by an electrical conductor, electrode $A_2$ is connected to electrode $A_2'$, etc. Moreover, the return electrodes are electrically connected (i.e., electrode $A_N$ is conductively coupled to electrode $A_N'$). In such alternative embodiments, the digital-to-analog converter 430 can be simplified to drive only one electrode in each pair. Similarly, the monitor electrodes 442 can be electrically connected in pairs, i.e., with electrode $M_1$ connected to $M_1'$, electrode $M_2$ connected to $M_2'$, etc. It is also contemplated that each electrode 432, 442, can be individually driven/sensed and that the control module 410 can collect the pair-wise measurements by appropriately combining the individual electrode currents and voltages.

FIG. 5 shows the physical construction of an illustrative wireline laterolog tool 502. LWD laterolog tools and tubing-conveyed laterolog tools are similar but for the form of the main tool body (e.g., a drill collar vs. a wireline sonde). Wireline laterolog tool 502 is shown having (for the sake of illustration) equally-spaced current electrodes 432 (electrodes $A_0, A_1, A_2, \ldots A_6, A_1', A_2', \ldots A_6'$), with interspersed monitor electrodes 442 (electrodes $M_1$-$M_{10}$ and $M_1'$-$M_{10}'$) on a wireline tool body. It is desirable to separate the monitor electrodes 442 from the current electrodes 432 because the current electrodes 442 often develop an impedance layer that distorts voltage measurements when current is flowing.

In practice, the electrodes 432 need not be equally sized and spaced. Better performance can be achieved by having the more distant current electrodes 432 increase in size. Thus, in one contemplated embodiment the center electrode $A_0$ has an axial length of 15.2 cm. The lengths of current electrodes $A_i$ and $A_i'$ for i ranging from 1 to 6 is (in cm) 15.2, 20.3, 25.4, 35.6, 50.8, and 190.5. The spacing between the current electrodes 432 also increases, beginning at 15.2 cm between electrodes $A_0$ and $A_1$, 15.2 cm between electrodes $A_1$ and $A_2$, 25.4 cm between electrodes $A_2$ and $A_3$, 35.6 cm between $A_3$ and $A_4$, 48.3 cm between $A_4$ and $A_5$, and 86.4 cm between $A_5$ and $A_6$. (These spacings are measured between the nearest edges and not center to center, and they are symmetric with respect to the center electrode.) In this contemplated embodiment, each of the monitor electrodes 442 has an axial length of 2.5 cm.

With one exception, the monitor electrodes 442 are spaced 2.5 cm away from the nearest current electrode. (Electrodes $M_2$ an $M_2'$ may be spaced 5.1 cm from current electrodes $A_1$ and $A_1'$, respectively.)

As illustrated in FIG. 6, the tool electronics employ the current electrodes 432 to provide the currents $I_0$-$I_5$ and $I_0'$-$I_5'$. Currents $I_0$-$I_5$ are sourced from current electrodes $A_0$-$A_5$ respectively, with current electrode $A_6$ serving as a common return electrode for each of these currents. Similarly, currents $I_0'$-$I_5'$ are sourced from current electrodes $A_0$ and $A_1'$-$A_5'$ respectively, with current electrode $A_6'$ serving as a common return electrode for these currents. If the current electrodes 432 and monitor electrodes 442 are pair-wise connected as discussed before, the laterolog tool 502 operates on the combined currents ($I_0+I_0'$, $I_1+I_1'$, $I_2+I_2'$, . . . ). Otherwise, the laterolog tool 502 can analyze currents $I_0$-$I_5$ separately from $I_0'$-$I_5'$, or in the alternative, combine the currents and voltages digitally before analyzing.

To enable the monitor electrodes 442 to distinguish the effects of the various currents, the currents are given distinguishable features. In one or more tool embodiments, the current electrodes 432 are pair-wise connected and currents $I_0$-$I_5$ have distinguishable combinations of signal frequencies $f_1$-$f_6$. The frequency set can offer sufficient frequency spacing to enable fast logging, while not spreading the frequencies so far apart as to incur excessive frequency dependence in the formation resistivity measurements. Moreover, the frequency set can avoid the use of harmonic frequencies which could be unduly sensitive to nonlinear effects in the system. For example, one contemplated set of frequencies includes 80 Hz, 115 Hz, 145 Hz, 185 Hz, 235 Hz, and 285 Hz. (It is expected that the borehole fluid will be fairly conductive, thereby allowing low frequency currents to pass into and through the formation.) Nevertheless, other sets of frequencies would also be suitable for distinguishing the currents.

As the laterolog tool 502 drives the current electrodes 432, the currents pass through the borehole fluid and the formation to reach the return electrodes $A_6$, $A_6'$, creating a field potential indicative of the resistivity of the materials along the various current flow paths. Multiple currents with different signal frequencies can be passed to the formation simultaneously to parallelize excitations and increase operational speed and time efficiency of the laterolog tool 502. The control module 410 records a voltage signal from each monitor electrode 442 to measure the field potential at the monitor electrode locations. A frequency analysis of the voltage signals (e.g., by Fourier transform, filtering, or least-squares curve fitting) separates out those voltage signal components V attributable to each of the currents. As it is the physical tool construction that is of interest here, the precise details of the voltage component separation methods are not explored further herein. The interested reader can find such details in the following published patent applications: PCT/US2012/046757, "Multi-array laterolog tools and methods with split monitor electrodes" by inventors Xiaochun Nie, Shanjun Li, Burkay Donderici, and Luis San Martin; PCT/US2011/058867, "Multi-array laterolog tools and methods with differential voltage measurements" by inventors Shanjun Li and Luis San Martin; and PCT/US/2010/056645, "Multi-array laterolog tools and methods" by inventors Michael Bittar, Shanjun Li, and Jing Li.

With the isolation of a voltage signal component V attributable to a given current I, the control module 410 and/or the computer 31, 45, 66, can determine the measured complex impedance Z from the ratio V/I. Although the formation resistivity is a major contributor to this measured impedance, the measurements obtained by laterlog tools often include signal cross-coupling. A consideration of the principles set forth in FIGS. 4-6 reveals that, particularly in the case of the leads to the outermost current electrodes 432 and to the outermost monitor electrodes 442, the voltage sensing conductors run for a significant distance in the proximity of the current conductors. (A typical laterolog tool may be 10-15 meters long, meaning a lead length of 5-7 meters would not be unusual.) This proximity causes the impedance measurements (Z=V/I) to include significant contributions from the resulting signal cross-coupling. Moreover, these contributions are frequency dependent.

Figure 7A:
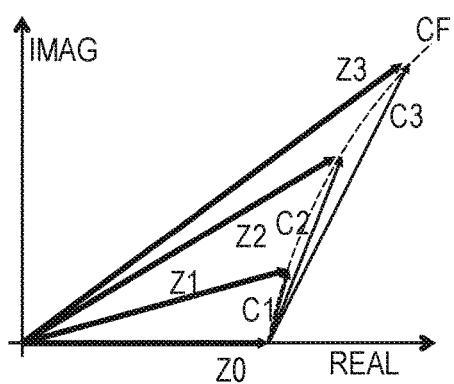
FIG. 7A shows an illustrative trend of frequency-dependent measurements.

FIG. 7A shows the effect of the signal cross-coupling on an illustrative impedance measurement. Three hypothetical impedance measurements Z1, Z2, and Z3, result from voltage measurements acquired by a given monitor electrode 442 in response to a current transmitted at three different frequencies between a given pair of current electrodes 442.

The impedance measurements are shown as phasors, each having a magnitude and phase in the complex plane. Equivalently, the impedance measurements each have an in-phase (real) component along the horizontal axis, and a quadrature-phase (imaginary) component along the vertical axis. The authors have observed that the value of "true" impedance Z0 is the formation resistivity that would be measured in the absence of any signal cross-coupling. This value is shown as a phasor lying along the horizontal axis. Impedance measurement Z1 is the sum of the true impedance Z0 and a cross-coupling contribution C1. Similarly, Z2 is the vector sum of Z0 and C2. Z3 is the vector sum of Z0 and C3. The authors have noted that if measurements were gathered at more frequencies, they would gradually trace out a curve CF in the complex plane. With enough measurements, a computer can fit a polynomial function to the curve and extrapolate the curve to determine its intersection with the horizontal axis. This intersection serves as an estimate of the true impedance Z0. Though the measurements are obtained using different signal frequencies, the extrapolation itself is not a function of frequency. Rather, the extrapolation is a function of the interdependence between the in-phase and quadrature-phase components.

Figure 8:
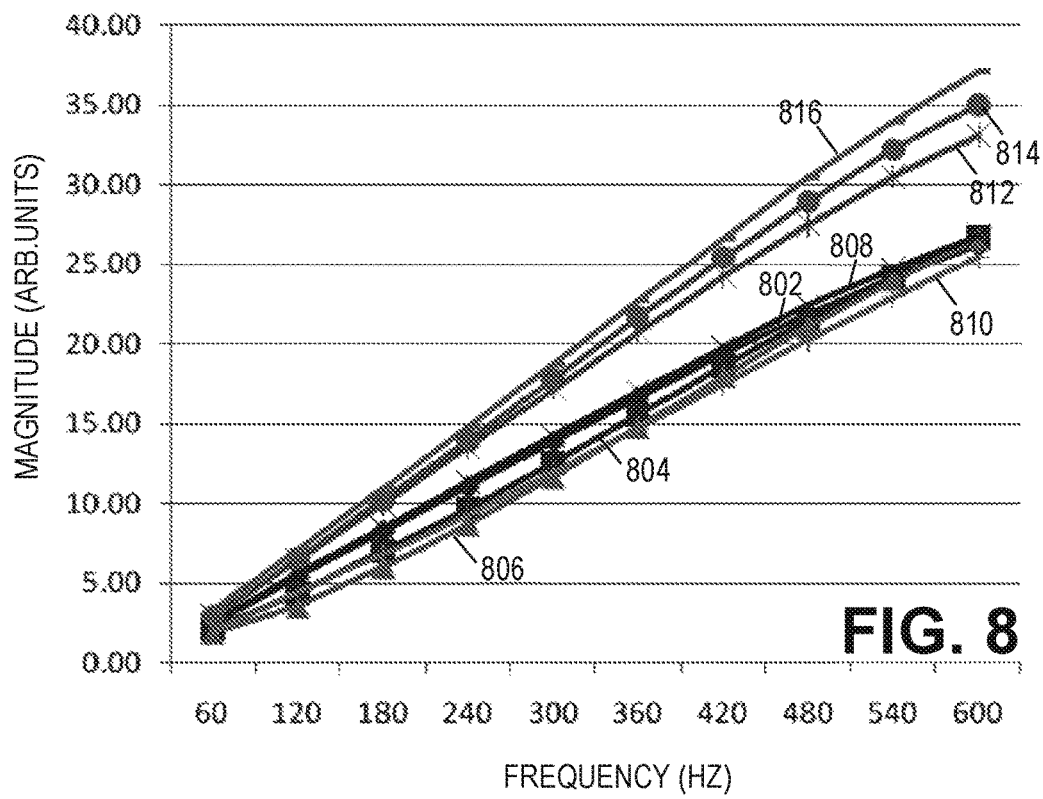
FIG. 8 shows several illustrative frequency dependences for measurement magnitude.
Figure 9:
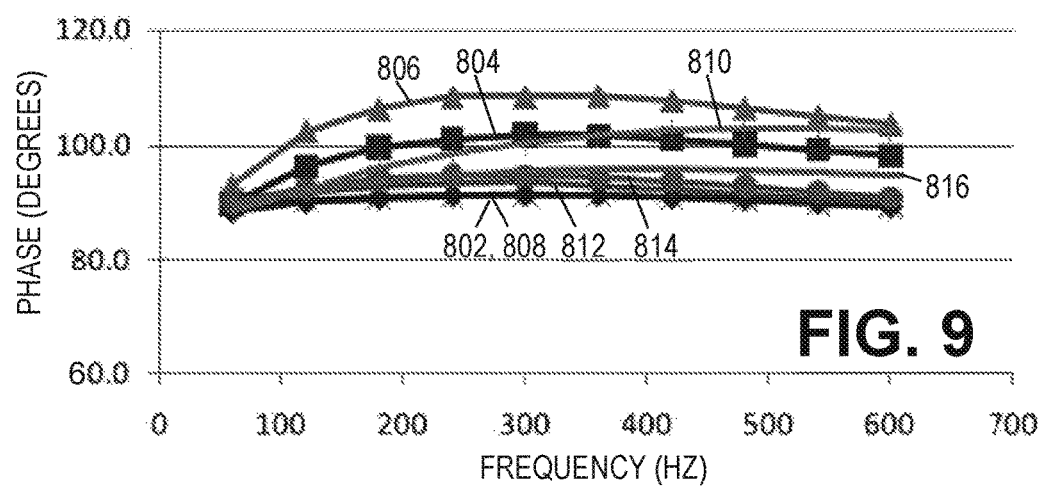
FIG. 9 shows several illustrative frequency dependences for cross-coupling phase.

Experiments with different tool configurations suggest that the polynomial function can be first order (i.e., linear) and still provide an excellent fit to the curve CF, particularly for small cross-coupling contributions. FIGS. 8 and 9 respectively show magnitude and phase of the cross-coupling contributions as a function of frequency for different tool wiring configurations. Each of the measurements was made with a lead from a monitor electrode (e.g., $M_{10}$) running parallel to a lead from the return electrode (e.g., $A_6$), using different termination configurations (balanced, unbalanced, and single termination resistor). Eight curves 802-816 are shown. Curve 802 shows the cross coupling contribution with a balanced termination for the monitor lead and a balanced termination for the return lead. Curve 804 shows the cross coupling contribution with a balanced termination for the monitor lead and an unbalanced termination for the return lead. Curve 806 shows the cross coupling contribution with a balanced termination for the monitor lead and a single termination resistor for the return lead. Curve 808 shows the cross coupling contribution with an unbalanced termination for the monitor lead and a balanced termination for the return lead. Curve 810 shows the cross coupling contribution with an unbalanced termination for the monitor lead and a single termination resistor for the return lead. Curve 812 shows the cross coupling contribution with a single termination resistor for the monitor lead and a balanced termination for the return lead. Curve 814 shows the cross coupling contribution with a single termination resistor for the monitor lead and an unbalanced termination for the return lead.

Curve 816 shows the cross coupling contribution with a single termination resistor for the monitor lead and a single termination resistor for the return lead. Note that the magnitudes are substantially linear and the phase is substantially independent of frequency.

Figure 7B:
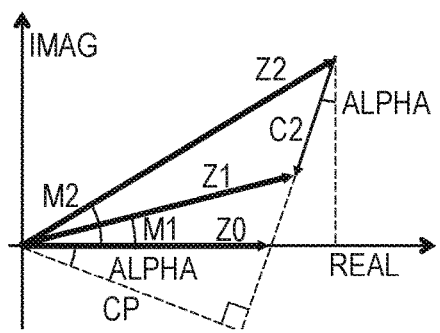
FIG. 7B shows an illustrative extrapolation technique.

Accordingly, as suggested in FIG. 7B, the true impedance Z0 can be estimated from two measurements Z1, Z2 at different signal frequencies. The difference between the two measurements Z1-Z2 is also the difference between the two cross-coupling contributions C1-C2. In one implementation, the extrapolation is performed by determining from this difference the angle α (alpha) associated with the cross-coupling contributions. Combining α with an angle M1 between Z0 and Z1 for the measurement phasor Z1 (or with an angle M2 between Z0 and Z2 for the measurement phasor Z2) yields the magnitude of the perpendicular line from the origin, CP:

$$|CP|=|Z1|\cos(M1+\alpha)=|Z2|\cos(M2+\alpha).$$

Since CP is also equal to $|Z0|\cos(\alpha)$, we have:

$$|Z0|=|Z1|\cos(M1+\alpha)/\cos(\alpha)=|Z2|\cos(M2+\alpha)/\cos(\alpha)$$

Alternatively, representing the real and imaginary (i.e., in-phase and quadrature) components of Z1 as A1 and B1, and similarly representing the respective components of Z2 as A2 and B2, the slope of a line through the two points is $$S=(B2-B1)/(A2-A1),$$

and the crossing of the real axis is readily determined from either set of components as:

$$Z0=A1-(B1/S)=A2-(B2/S).$$

Where more than two measurements are available, a standard minimum mean square error linear fit can be used to determine the slope of the line and its intersection with the real axis. Where the cross-coupling effects grow large enough to deviate from substantial linearity, a higher-order polynomial may be used to fit a curve to the measurements and derive an estimate of the compensated impedance. The order of the polynomial can be less than the number of measurements to assure that the solution is unique.

Figure 10:
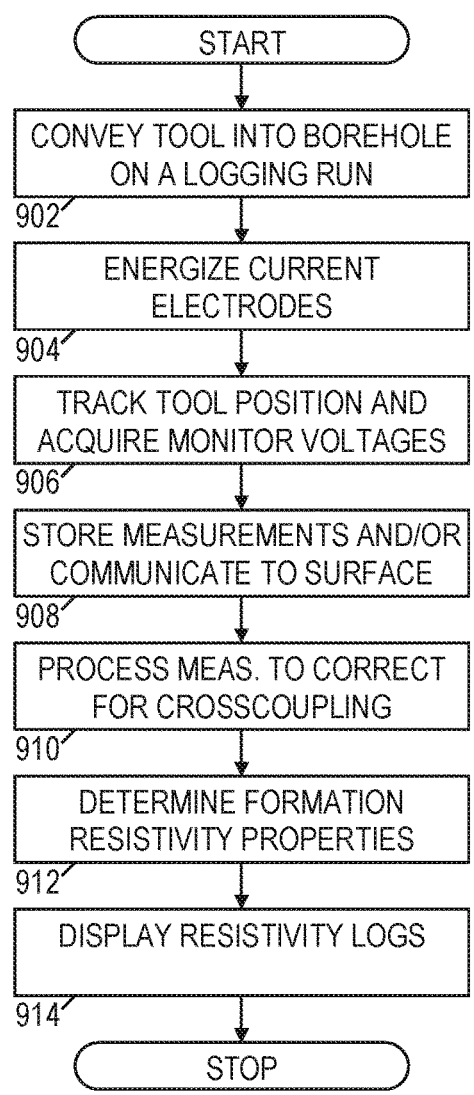
FIG. 10 is a flow diagram of an illustrative logging method with cross-coupling compensation.

FIG. 10 is a flow diagram of an illustrative logging method that employs the foregoing principles for cross-coupling compensation. Beginning in block 902, a laterolog tool is conveyed through a borehole to perform measurements of formation properties. The laterolog tool can be drawn through the borehole by a wireline cable, or conveyed on a tubing string, or incorporated into the assembly of logging tools in a drill string. In block 904 the tool electronics energize the current electrodes to generate currents in the manner outlined previously. In block 906, the tool or some other component of the system tracks the motion and/or position of the laterolog tool as the tool electronics sample the voltage signals from the monitor electrodes. In block 908, the tool electronics record the voltage signals into an information storage medium and/or communicate the voltage signal data to a computer on the surface. In block 910, the voltage signals are processed (downhole or at the surface) in accordance with one of the methods discussed above to determine impedance measurements that have been compensated for cross-coupling. In block 912, the compensated impedance measurements are then processed using known laterolog tool inversion techniques to determine formation resistivity measurements at different depths of investigation (i.e., different effective radial measurement depths), enabling the logging system to determine a formation resistivity log that depends both on position along the borehole axis and on radial distance from the borehole axis. Some or all of the formation resistivity log data is displayed to a user in block 914.

Thus, embodiments disclosed herein include:

A: A logging method that comprises: obtaining multi-frequency measurements of signal magnitude and phase at a position along a borehole; extrapolating a trend of said multi-frequency measurements in a complex plane to determine a compensated measurement for that position; repeating said obtaining and extrapolating to determine a compensated measurement for each of multiple positions along a borehole; and deriving from the compensated measurements a formation property log.

B: A logging system that comprises: a memory having logging software; and a processing unit coupled to the memory to execute the software, wherein the software causes the processing unit to implement a method including: obtaining multi-frequency measurements of signal magnitude and phase at a position along a borehole; extrapolating a trend of said multi-frequency measurements in a complex plane to determine a compensated measurement for that position; repeating said obtaining and extrapolating to determine a compensated measurement for each of multiple positions along a borehole; and deriving from the compensated measurements a formation property log.

C: A non-transient information storage medium having computer executable instructions for processing logging data, wherein execution of the instructions causes one or more computers to carry out a method comprising: obtaining multi-frequency measurements of signal magnitude and phase at a position along a borehole; extrapolating a trend of said multi-frequency measurements in a complex plane to determine a compensated measurement for that position; repeating said obtaining and extrapolating to determine a compensated measurement for each of multiple positions along a borehole; and deriving from the compensated measurements a formation property log.

Each of the embodiments A, B, and C, may have one or more of the following additional elements in any combination: Element 1: wherein the method further comprises displaying the formation property log to a user. Element 2: wherein the formation property log is a resistivity log. Element 3: wherein the formation property log shows a dependence of resistivity on radial distance from the borehole. Element 4: wherein said multi-frequency measurements are laterolog tool measurements of formation resistivity. Element 5: wherein said multi-frequency measurements are obtained as in-phase and quadrature-phase signal components. Element 6: wherein said extrapolating models the trend as linear. Element 7: wherein said extrapolating models the trend as a polynomial function of a quadrature-phase signal component's dependence on an in-phase signal component. Element 8: wherein said extrapolating includes fitting a line or curve to the measurements in the complex plane and determining a value for a crossing of the real axis.

Numerous variations and modifications will become apparent to those skilled in the art once the above disclosure is fully appreciated. For example, the foregoing disclosure focuses on cross-coupling compensation for impedance measurements of laterolog tools, but the disclosed principles are applicable to other tools having measurement signal conductors near high-power signal lines. It is intended that the claims be interpreted to embrace all such variations and modifications.

What is claimed is:

1. A logging method that comprises:
conveying a wireline laterolog tool downhole, wherein the wireline laterolog tool comprises:
a plurality of current electrodes, wherein the plurality of current electrodes provide a current that is driven into a subterranean formation; and
a plurality of monitor electrodes, wherein the plurality of monitor electrodes receive a voltage signal induced by the plurality of current electrodes; and
obtaining multi-frequency measurements of signal magnitude and phase at a position along a borehole with the wireline laterolog tool;
extrapolating a trend of said multi-frequency measurements in a complex plane to determine a compensated measurement for that position by determining a difference between the multi-frequency measurements of an angle associated with cross-coupling contributions;
repeating said obtaining and extrapolating to determine a compensated measurement for each of multiple positions along a borehole; and
deriving from the compensated measurements a formation property log.

2. The method of claim 1, wherein the method further comprises displaying the formation property log to a user.

3. The method of claim 1, wherein the formation property log is a resistivity log.

4. The method of claim 3, wherein the formation property log shows a dependence of resistivity on radial distance from the borehole.

5. The method of claim 1, wherein said multi-frequency measurements are laterolog tool measurements of formation resistivity.

6. The method of claim 1, wherein said multi-frequency measurements are obtained as in-phase and quadrature-phase signal components.

7. The method of claim 1, wherein said extrapolating models the trend as linear.

8. The method of claim 1, wherein said extrapolating models the trend as a polynomial function of a quadrature-phase signal component's dependence on an in-phase signal component.

9. The method of claim 1, wherein said extrapolating includes fitting a line or curve to the measurements in the complex plane and determining a value for a crossing of the real axis.

10. A logging system that comprises:
a wireline laterolog tool, wherein the wireline laterolog tool comprises:
a plurality of current electrodes, wherein the plurality of current electrodes provide a current that is driven into a subterranean formation; and
a plurality of monitor electrodes, wherein the plurality of monitor electrodes receive a voltage signal induced by the plurality of current electrodes;
a memory having logging software; and
a processing unit coupled to the memory to execute the software, wherein the software causes the processing unit to implement a method including:
obtaining multi-frequency measurements of signal magnitude and phase at a position along a borehole;
extrapolating a trend of said multi-frequency measurements in a complex plane to determine a compensated measurement for that position by determining a difference between the multi-frequency measurements of an angle associated with cross-coupling contributions;
repeating said obtaining and extrapolating to determine a compensated measurement for each of multiple positions along a borehole;
deriving from the compensated measurements a formation property log; and
displaying the formation property log to a user.

11. The system of claim 10, wherein the formation property log is a resistivity log.

12. The system of claim 10, wherein said multi-frequency measurements are laterolog tool measurements of formation resistivity.

13. The system of claim 10, wherein said extrapolating models the trend as a linear or polynomial function of a quadrature-phase signal component's dependence on an in-phase signal component.

14. The system of claim 10, wherein said extrapolating includes fitting a line or curve to the measurements in the complex plane and determining a value for a crossing of the real axis.

15. A non-transient information storage medium having computer executable instructions for processing logging data, wherein execution of the instructions causes one or more computers to carry out a method comprising:

obtaining multi-frequency measurements of signal magnitude and phase at a position along a borehole by using a wireline laterolog tool, wherein the wireline laterolog tool comprises a plurality of current electrodes and a plurality of monitor electrodes, wherein the plurality of current electrodes provide a current that is driven into a subterranean formation, wherein the plurality of monitor electrodes receive a voltage signal induced by the plurality of current electrodes;

extrapolating a trend of said multi-frequency measurements in a complex plane to determine a compensated measurement for that position by determining a difference between the multi-frequency measurements of an angle associated with cross-coupling contributions;

repeating said obtaining and extrapolating to determine a compensated measurement for each of multiple positions along a borehole; and deriving from the compensated measurements a formation property log.

16. The medium of claim 15, wherein the method further comprises displaying the formation property log to a user.

17. The medium of claim 15, wherein the formation property log is a resistivity log.

18. The medium of claim 15, wherein said multi-frequency measurements are laterolog tool measurements of formation resistivity.

19. The medium of claim 15, wherein said extrapolating models the trend as a linear or polynomial function of a quadrature-phase signal component's dependence on an in-phase signal component.

20. The medium of claim 15, wherein said extrapolating includes fitting a line or curve to the measurements in the complex plane and determining a value for a crossing of the real axis.

* * * * *